United States Patent [19]

Miura

[11] Patent Number: 4,870,503
[45] Date of Patent: Sep. 26, 1989

[54] DATA COMMUNICATION SYSTEM

[75] Inventor: Shigeo Miura, Tokyo, Japan

[73] Assignee: Canon Kabushiki Kaisha, Tokyo, Japan

[21] Appl. No.: 945,895

[22] Filed: Dec. 24, 1986

[30] Foreign Application Priority Data

Dec. 27, 1985 [JP] Japan .................................. 60-292977

[51] Int. Cl.[4] .............................................. H04N 1/00
[52] U.S. Cl. ..................................... 358/256; 353/440;
353/408; 379/100
[58] Field of Search ........................ 364/403; 340/825;
379/100; 358/434, 440, 408

[56] References Cited

U.S. PATENT DOCUMENTS

| | | | |
|---|---|---|---|
| 4,187,520 | 2/1980 | Beduchawd et al. | 358/257 |
| 4,255,766 | 3/1981 | Matsuda et al. | 358/257 |
| 4,317,136 | 2/1982 | Keyt et al. | 358/257 |
| 4,652,933 | 3/1987 | Koshiishi | 358/257 |
| 4,672,459 | 6/1987 | Kudo | 358/257 |
| 4,730,252 | 3/1988 | Bradshaw | 364/403 |
| 4,785,355 | 11/1988 | Matsumoto | 358/257 |

Primary Examiner—Edward L. Coles, Sr.
Attorney, Agent, or Firm—Fitzpatrick, Cella, Harper & Scinto

[57] ABSTRACT

A data communication system includes a modem for exchanging data, a memory for storing a plurality of pieces of addresser or receiver information, and an addresser designation key or one-touch dial key for selecting the addresser or receiver information from the memory and appending the selected information to the data sent through the modem. The addresser or receiver information is addresser or receiver name information. The system also includes a display unit from displaying the addresser or receiver information selected by the key.

20 Claims, 4 Drawing Sheets

FIG. 6

```
OOO xxx    DATE OO TIME xx  G3  P1
xxx P.K   TO MR YOSHIDA  29'
△△△-□□□□  OOO  TOKYO  MIURA
                           29
DEAR
― ― ― ― ― ― ― ―
― ― ― ― ― ― ― ―
― ― ― ― ― ― ― ―
― ― ― ― ― ― ― ―
― ― ― ― ― ― ― ―
― ― ― ― ― ― ― ―
― ― ― ― ― ― ― ―
― ― ― ― ― ― ― ―
            SINCERELY,
```

FIG. 4

```
OOO-xxxx   DATE OO TIME xx  G3  P1
xxx KAISHA P.K                  MIURA
△△△□□□□□□  OOO KAISHA  TOKYO
DEAR
― ― ― ― ― ― ― ―
― ― ― ― ― ― ― ―
― ― ― ― ― ― ― ―
― ― ― ― ― ― ― ―
― ― ― ― ― ― ― ―
― ― ― ― ― ― ― ―
― ― ― ― ― ― ― ―
― ― ― ― ― ― ― ―
            SINCERELY,
```

DATA COMMUNICATION SYSTEM

BACKGROUND OF THE INVENTION

1. Field of the Invention

The present invention relates to a data communication system for appending predetermined identification information to data and transmitting the result data.

2. Related Background Art

In a conventional system of this type, e.g., a facsimile system for performing image data communication, information such as an addresser name, telephone number or page number is automatically added or appended to an original image to be sent, and the resultant data is sent to a destination.

Such addresser information is entered as a desired character string at a keyboard and stored in a memory. The addresser information is converted into image data by a character generator, and the image data is sent to the destination and recorded as image information at the receiving end. The addresser information is generally affixed at the head of each page for instance.

In a conventional facsimile system, however, only one addresser information can be registered. For this reason, if there are a plurality of addressers such as operators of the facsimile system or authors of the original, the addresser names must be written in the original, and the original image must be sent.

The sending operation undesirably becomes cumbersome.

SUMMARY OF THE INVENTION

It is an object of the present invention to improve a data communication system.

It is another object of the present invention to eliminate the conventional drawbacks described above.

It is still another object of the present invention to register a plurality of pieces of addresser information beforehand and to select desired addresser information at the time of data transmission.

It is still another object of the present invention to register a plurality of addresser names, and to allow selection of a desired addresser name and sending of the selected addresser name as image information.

The above and other objects, features, and advantages of the present invention will be apparent from the following detailed description of the preferred embodiments.

BRIEF DESCRIPTION OF THE DRAWINGS

FIG. 4 is a view showing an example of recording at a receiving end;

FIG. 6 is a view showing an example of recording at a receiving end according to the control sequence in FIG. 5.

DETAILED DESCRIPTION OF THE PREFERRED EMBODIMENTS

The preferred embodiments of the present invention will be described in detail with reference to the accompanying drawings.

Figure 1:
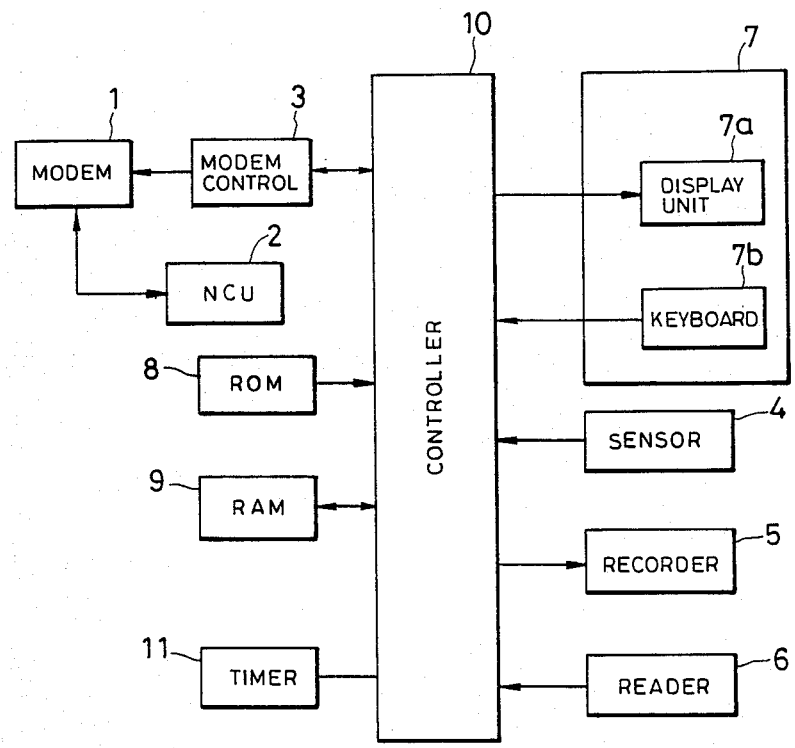
FIG. 1 is a block diagram showing an arrangement of a facsimile system according to an embodiment of the present invention.

FIG. 1 is a flow diagram showing an arrangement of a facsimile system according to an embodiment of the present invention.

In the facsimile system of this embodiment, a reader 6 comprising a CCD line sensor reads an original. Reception image data is recorded by a recorder 5 using a heat-sensitive printer. Redundancy suppression of image data and the overall control operation of the system are controlled by a controller 10 comprising a microcomputer or the like.

Image information or protocol signal is sent or received through a modem 1. Modulation and demodulation of the modem 1 are controlled by the controller 10 through a modem control 3. The modem 1 exchanges a send/receive signal with telephone lines through an NCU 2 for holding the connection loop with the telephone lines or switching between the telephone set and the facsimile system.

Control programs or parameters of the controller 10 are stored in a ROM 8. Image information to be sent or received is stored in a RAM 9. The controller 10 comprises a microcomputer or the like.

The facsimile system also includes an operation unit 7 consisting of a display unit 7a and a keyboard 7b. The controller 10 controls sending or reception on the basis of an operation input from the operation unit 7.

The keyboard 7b has a plurality of one-touch dial keys. Telephone numbers of desired receiving stations can be respectively assigned to the one-touch dial keys. The telephone numbers registered by predetermined operations are stored in predetermined areas of the ROM 8.

At the time of registration, character information such as destination company names and abbreviations can be entered at the keyboard 7b according to predetermined operations and can be stored in a predetermined area of the ROM 8.

In this embodiment, if additional facsimile systems are installed, individual names of a plurality of addressers and departments or sections to which these addressers belong can be entered at the keyboard 7b. The plurality of addresser names entered at the keyboard 7b are stored in predetermined areas of the ROM 8.

A plurality of receivers for possibly receiving an original within a single destination station may be entered at the keyboard 7b. In this case, the plurality of receiver names are also stored in predetermined areas of the ROM 8.

Character selection at the time of registration can be made using a known character input system using a ten-key pad and letter keys. The types of characters include any desired characters such as letters, kanji characters, kana characters, and the like.

The ROM 8 is partially constituted by an EEPROM (Electrically Erasable Programmable Read-Only Memory) for storing the above-mentioned information upon electrical write access. It should be noted that the stored information can be retained even after the main power switch is turned off.

In order to select a plurality of addresser names stored in the ROM 8, known operation keys, and an addresser selection key in addition to the one-touch dial keys described above are arranged. Selection control will be described in detail later on.

Referring to FIG. 1, the facsimile includes sensors 4 which comprise known sensors for detecting the presence/absence of an original and recording paper. The sensors are used for control such as sending/reception or original copying in the same manner as in the conventional facsimile system. In order to send addresser station, receiving station, addresser, and receiver information as image information, a converter circuit such as a character generator (not shown) is arranged in the facsimile system. It should be noted that the character generator is built into the controller 10.

A timer 11 connected to the controller 10 is used for selection control of an addresser name (to be described in detail later).

The destination (receiving) station for the sending original is designated by the one-touch dial key on the keyboard 7b. In this case, the addresser can also use the addresser selection key to select one of the plurality of addresser names stored in the ROM area. The readout information can be sent as image information to the receiving end.

Figure 2:
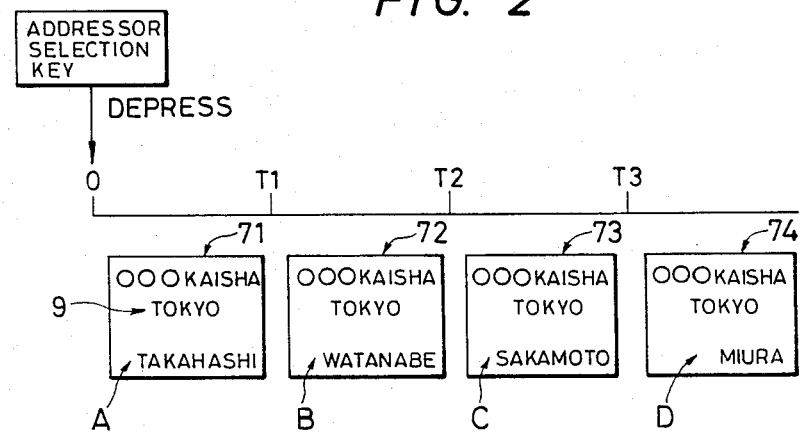
FIG. 2 is a diagram showing an example of operation of the facsimile system in FIG. 1.

FIG. 2 shows an example of selection of an addresser name at the time of original sending.

The plurality of addressers are stored in a priority order, i.e., the first addresser, the second addresser, ... in the ROM 8. The addressers are selected on the basis of this priority order.

In the operation of FIG. 2, the plurality of addresser names (in this case, individual names) are selectively designated according to depression time of the addresser selection key at the time of sending. When the addresser selection key is depressed at a timing 0, "000 Kaisha Tokyo" is displayed on the display unit 7a as the name of the addresser station, as indicated by reference numeral 71. A first addresser name A, i.e., "Takahashi" is displayed below "Tokyo".

When the addresser selection key is continuously depressed, the subsequent addresser names, e.g., "Watanabe", "Sakamoto", and "Miura" are sequentially displayed at timings T1, T2, and T3. When a desired addresser is displayed on the display unit 7a, the operator stops depressing the addresser selection key to select the currently displayed addresser name. This name is added as image data to the original image, and the composite data is sent to the receiving end.

Figure 3A:
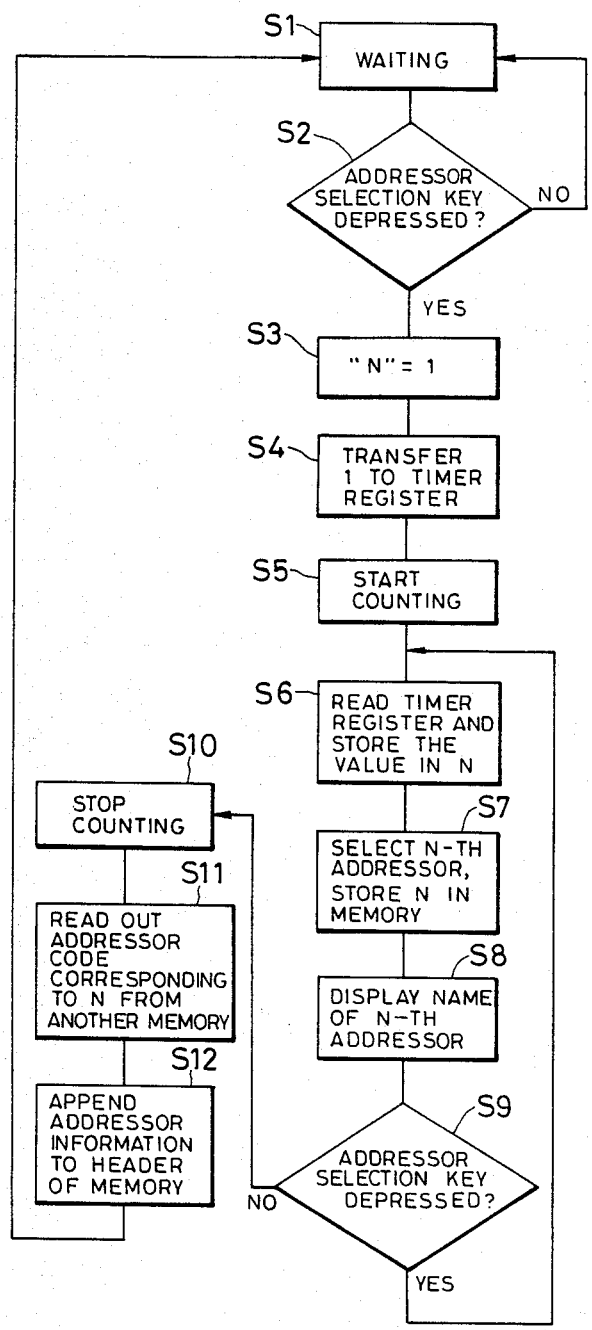
FIGS. 3A and 3B are respectively flow charts for explaining operations in the send mode.
Figure 3B:
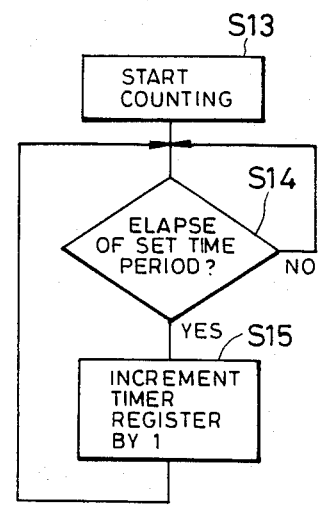

The control sequence of the controller 10 for performing the above-mentioned control is shown in FIGS. 3A and 3B. FIG. 3A shows a routine for selecting an addresser, and FIG. 3B shows counting of the timer 11 which is simultaneously performed with the routine in FIG. 3A.

The waiting state of the facsimile system is shown in step S1 in FIG. 3A. The waiting state in step S1 continues unless the addresser selection key is depressed in step S2.

When the addresser selection key is depressed, the telephone number corresponding to the addresser selection key is read out from the ROM 8 and is converted to a selection signal such as a dial tone. The selection signal is thus prepared in a predetermined area of the RAM 9. At the same time, a register or memory area N for designating the addresser is initialized to 1 in step S3. If area N is set to be N=1, the first addresser name is designated. If N=2, then the second addresser name is accessed.

In step S4, "1" is transferred to the timer register counted up upon operation of the timer 11, thus initializing the timer register. In step S5, the timer 11 is started.

When the timer 11 is started in step S13 of FIG. 3B, the timer 11 counts the lapse of a predetermined time period in step S14. This time period corresponds to the duration between times T0 and T1 in FIG. 2.

When the predetermined time period has elapsed, the timer 11 increments the timer register by one due to an overflow in step S15.

A loop of steps S6 to S9 is performed after the start of the timer in FIG. 3A. In step S6, the value of the timer register counted for every predetermined time period is read out and is stored in the area N. In step S7, the N-th addresser name is selected, and the corresponding character code is read out from the predetermined area of the ROM 8. The readout data is stored in the predetermined area of the RAM 9.

In step S8, the character string of the selected addresser name is supplied to and displayed on the display unit 7a. The operator monitors the above operation and knows whether or not he has made correct operations.

The controller 10 determines in step S9 whether the addresser selection key in the operation unit 7 is kept depressed. If YES in step S9, the flow returns to step S6, and the loop is repeated.

In the loop of steps S6 to S9, the addresser name is changed for every predetermined time period if the selection key is kept depressed. At the same time, the display contents are changed accordingly. In the above loop, assuming that the operator continuously depresses the addresser selection key even after the last addresser name is displayed, a determination routine for resetting the count when N reaches a predetermined number may be inserted.

When the operator stops depressing the addresser selection key as the desired addresser name is displayed in step S9, the flow advances to step S10, and the timer is stopped. The last addresser name is fixed on the RAM 9.

In step S11, this character code is converted into image data, by a dot matrix corresponding to the character code, by using a character generator in the controller 10. The converted image data is appended to the header of the original image information area of the RAM 9 in step S12.

The addresser name is appended together with image data (e.g., the destination station name, the abbreviation, the number of pages, and the communication name) at the head of the original. The flow then returns to step S1, and the controller 10 waits until a send instruction is input.

When an original is set on the facsimile system and the one-touch dial key or the start key is depressed, sending operation is started. In this state, original data read by the reader 6 is stored in the subsequent area of the image information area for the destination station name and the addresser name. Thereafter, the composite data is sent according to the same protocol as the conventional one. At the time of storage data in the memory or data sending, redundancy suppression may be performed such that the image data is converted by modified Huffman or modified READ coding.

As described above, the recording result at the receiving end is obtained, as shown in FIG. 4. FIG. 4 shows recording paper 21 on which the information transmitted on the basis of the predetermined protocol is recorded. At the first line of the page, a telephone number 22, a data 23, a communication mode 24, and a page number 25 are recorded.

In the following second line, a receiving station name 26 is inserted. In the third line, a telephone number 27 of the addresser station, a name 28 of the addresser station, and the selected addresser name ("Miura") 29 are recorded. In the subsequent lines, the actually read original image is recorded. It should be noted that the recording format is not limited to the one described above.

With the above arrangement, since a plurality of addresser names of the addresser station installed beforehand are registered, cumbersome handwriting and other operations can be omitted, and the addresser name is automatically added to the original.

With the above arrangement, once registration is correctly performed, the same addresser name can be used for subsequent communication. In addition, since the actual addresser name is displayed, incorrect information is not sent.

With the above arrangement, the system configuration is neither complicated nor expensive. In addition, the actual operations are very simple.

In the above embodiment, the addresser names can be selectively designated according to the duration of the depression time of the addresser selection key. However, separate keys as selection keys may be arranged so as to correspond to the number of addressers. In this case, the selection keys are respectively assigned to the first addresser, the second addresser, and so forth and can be commonly used for all destinations.

Figure 5:
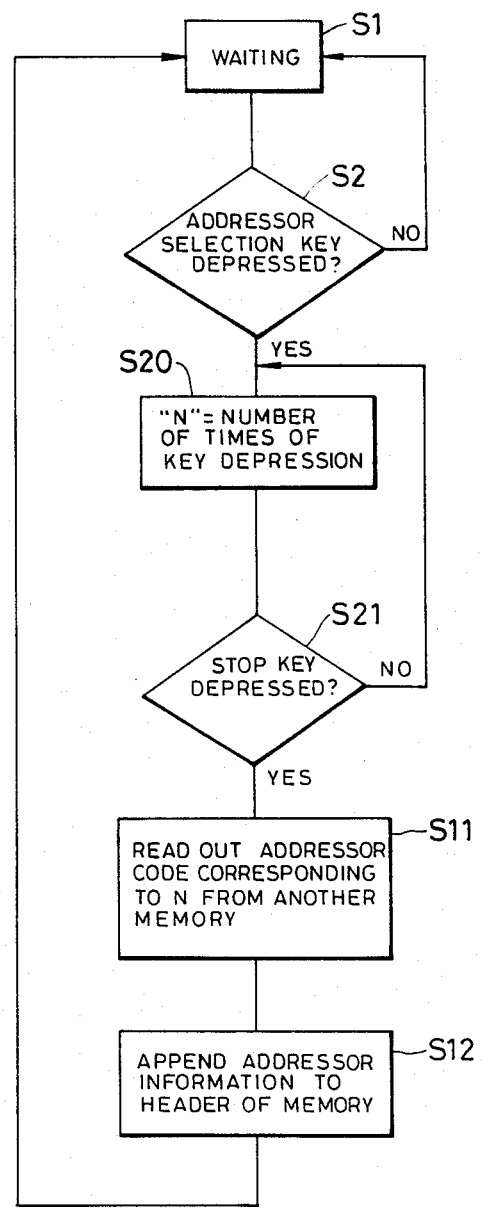
FIG. 5 is a flow chart for explaining control sequences according to another embodiment of the present invention.

As shown in a flow chart of FIG. 5, the addresser names may be selectively designated according to the number of times of depression of the selection key.

The operations in step S1, S2, S11, and S12 are the same as those in FIG. 3. Steps S20 and S21 constitute an addresser selection rouiine between steps S1 and S11.

In step S20, the number of times of depression of the addresser selection key is set to be the content of a register N for designating the addresser.

The addresser name is changed every time the selection key is depressed, and the display content is also changed accordingly.

In step S21, the addresser name selected (displayed) upon depression of the predetermined key (a stop key in this case) is fixed. The selected addresser name is used for information sending.

In processing of FIG. 5, the desired addresser name can be easily selected and can be appended to the header of original image information.

In the arrangement of FIG. 1, a plurality of receiver names of a receiving station can be registered in addition to the addresser names. The receiver names registered in the same manner as described above can be selectively designated, and the selected name can be sent as image information. In addition, the name can be selected by the one-touch dial key. If a one-touch dial key is used, the "addresser selection key" is replaced with the "one-touch dial key" in the operations in FIGS. 3 and 5, thereby constituting a receiver selection routine. Upon depression of the one-touch dial key, a receiver station is selected, and the desired receiver is selected according to the duration of the depression of time or the number of times of depression of the one-touch dial key. In this case, a plurality of selection keys may be arranged to select the receiver.

FIG. 6 shows an example wherein the addresser and receiver names are recorded at the receiving end. In an original 21 of FIG. 6, a telephone number 22 of the receiving station, a data 23, a communication mode 24, and a page number 25 are recorded in the first line.

In the second line, a receiver station name 26 and a selected receiver name 29' ("Yoshida") are recorded. In the third line, a telephone number 27 of the addresser station, a name 28 of the addresser station, and a selected addresser name ("Miura") 29 are recorded. In the subsequent lines, the actually read original image is recorded. With this format, the individual names of the addresser and receiver, and the name such as the departments to which the addresser and receiver belong to need not be written on the original to be sent. Therefore, original sending can be greatly simplified.

As is apparent from the above description according to the embodiments of the present invention, the facsimile system for sending prestored information as image information includes memory means for storing a plurality of addresser names within an identical addresser station, and means for selectively designating the plurality of addresser names and converting it into image information. No cumbersome operation is required, and the addresser name information can be sent to the receiving end and recorded thereat. Therefore, operations can be simplified, and proper communications can be established between desired addresser and receiver stations.

The above embodiments exemplify the facsimile systems. However, the present invention is not limited to the facsimile system but is applicable to any other data communication systems (e.g., telex systems) for exchanging character code data. In the case of a telex system, the addresser information such as an addresser name is sent as code data.

The present invention is not limited to the particular embodiments described above. Various changes and modifications may be made within the spirit and scope of the invention.

What is claimed is:

1. An image data communication apparatus comprising:
   means for reading an original image to produce image data;
   means for sending image data obtained by said reading means;
   means for storing plural addresser information or plural receiver information for a destination;
   means for selecting at least one of said plural addresser information or plural receives information stored in said storing means;
   means for instructing the transmission of the image data obtained by said reading means; and
   means for controlling said sending means to send the image data with the selected addresser information or selected receives information appended thereto, wherein said selected information is appended to said image data when said instructing means instructs the transmission of said image data.

2. An apparatus according to claim 1, wherein the selecting means comprises operating means for allowing an operator to select the addresser or receiver information, the addresser or receiver information being selection on the basis of a predetermined operation input by said operating means.

3. An apparatus according to claim 1, wherein the addresser or receiver information comprises addresser or receiver name information.

4. An apparatus according to claim 2, wherein said selecting means selects the addresser or receiver information according to the time period for input operation by said operating means.

5. An apparatus according to claim 2, wherein said selecting means selects the addresser or receiver information according to the number of times of input operation of said operating means.

6. An apparatus according to claim 2, further comprising display means for displaying the addresser or receiver information, wherein said display means sequentially displays the addresser or receiver information stored in said storing means in accordance with the operation by said operating means.

7. A data communication apparatus comprising:
means for sending data;
means for storing plural addresser information or plural receiver information for a destination;
means for selecting at least one of said plural addresser information or said plural receiver information stored in said storing means;
means for displaying the addresser information or receiver information selected by said selecting means; and
means for controlling said sending means to send said data with the selected addresser or receiver information appended thereto,
wherein said display means sequentially displays said addresser information or said receiver information stored in said storing means in response to the selection by said selecting means.

8. An apparatus according to claim 7, wherein the selecting means comprises operating means for allowing an operator to select the addresser or receiver information, the addresser or receiver information being selected on the basis of a predetermined operation input by said operating means.

9. An apparatus according to claim 7, wherein the addresser or receiver information comprises addresser or receiver name information.

10. An apparatus according to claim 8, wherein said selecting means selects the addresser or receiver information according to the time period for input operation input time by said operating means.

11. An apparatus according to claim 8, wherein said selecting means selects the addresser or receiver information according to the number of times of input operation of said operating means.

12. A data communication apparatus comprising:
means for reading an original image to produce image data;
means for storing plural addresser information as character code data, respectively;
means for selecting one of said plural addresser information stored in said storing means;
means for converting character code data of addresser information into image data when the addresser information is selected by said selecting means; and
means for controlling said sending means to send the image data obtained by said reading means with the image data converted by said converting means, said latter image data being appending to said former image data.

13. An apparauts according to claim 12, wherein the addresser or receiver information is addresser or receiver name information of the image data.

14. An apparatus according to claim 12, further including input means for causing an operator to selectively input the addresser or receiver information, and said selecting means selects the addresser or receiver information on the basis of an input by said input means.

15. An apparatus according to claim 14, wherein said selecting means selects the addresser or receiver information according to the time period for selection input by said input means.

16. An apparatus according to claim 14, wherein said selecting means selects the addresser or receiver information according to the number of times of the input of said input means.

17. An apparatus according to claim 14, further including display means for displaying the addresser or receiver information, said display means being adapted to display the addresser or receiver information selected by said selecting means.

18. A data transmission apparatus comprising:
means for sending data;
means for designating a destination to which the data is sent;
means for storing plural receiver information for the destination;
means for selecting one of said plural receiver information stored in said storing means in response to designation operation by said designating means; and
means for controlling said sending means to send the data with the receiver information selected responsive to the designation operation by said designating means, said selected receiver information being appended to the data.

19. An apparatus according to claim 18, wherein said designating means designated a destination by using a one-touch dial key.

20. An apparatus according to claim 18, wherein the receiver information is information relative to a name of a data receiver.

* * * * *

UNITED STATES PATENT AND TRADEMARK OFFICE
CERTIFICATE OF CORRECTION

PATENT NO. : 4,870,503
DATED : September 26, 1989
INVENTOR(S) : Shigeo Miura

It is certified that error appears in the above-identified patent and that said Letters Patent is hereby corrected as shown below:

ON THE TITLE PAGE
[56] References Cited:

"4,187,520  2/1980  Beduchawd et al." should read
--4,187,520  2/1980  Beduchaud et al.--.

[57]   ABSTRACT:

Line 10, "from" should read --for--.

COLUMN 5:

Line 38, "rouiine" should read --routine--.

COLUMN 6:

Line 52, "plural receives information" should read --plural receiver information--.

Line 59, "selected receives information" should read --selected receiver information--.

Signed and Sealed this

Seventeenth Day of September, 1991

Attest:

HARRY F. MANBECK, JR.

*Attesting Officer*        *Commissioner of Patents and Trademarks*